(12) United States Patent
Schönleber et al.

(10) Patent No.: US 9,982,994 B2
(45) Date of Patent: May 29, 2018

(54) OPTICAL MEASURING METHOD AND MEASURING DEVICE HAVING A MEASURING HEAD FOR CAPTURING A SURFACE TOPOGRAPHY BY CALIBRATING THE ORIENTATION OF THE MEASURING HEAD

(71) Applicant: Precitec Optronik Gmbh, Neu-Isenburg (DE)

(72) Inventors: Martin Schönleber, Aschaffenburg (DE); Berthold Michelt, Wiesbaden (DE); Matthias Kunkel, Gelnhausen (DE)

(73) Assignee: Precitec Optronik Gmbh (DE)

( * ) Notice: Subject to any disclaimer, the term of this patent is extended or adjusted under 35 U.S.C. 154(b) by 0 days. days.

(21) Appl. No.: 15/588,021

(22) Filed: May 5, 2017

(65) Prior Publication Data

US 2017/0234678 A1 Aug. 17, 2017

Related U.S. Application Data

(63) Continuation of application No. 14/713,150, filed on May 15, 2015, now Pat. No. 9,677,871, which is a
(Continued)

(30) Foreign Application Priority Data

Nov. 15, 2012 (DE) .......................... 10 2012 111 008

(51) Int. Cl.
*G01B 9/02* (2006.01)
*G01B 11/24* (2006.01)
*G01B 11/14* (2006.01)

(52) U.S. Cl.
CPC ...... *G01B 11/2441* (2013.01); *G01B 9/02091* (2013.01); *G01B 11/14* (2013.01)

(58) Field of Classification Search
CPC ............ G01B 11/2441; G01B 9/02027; G01B 9/02028; G01B 9/02049; G01B 9/0209; G01B 9/02091
See application file for complete search history.

(56) References Cited

U.S. PATENT DOCUMENTS

| 4,861,131 A | 8/1989 | Bois et al. |
| 5,276,631 A | 1/1994 | Popovic et al. |
| (Continued) | | |

FOREIGN PATENT DOCUMENTS

| CN | 101365375 | 2/2009 |
| CN | 101393015 | 3/2009 |
| (Continued) | | |

OTHER PUBLICATIONS

Knuttel, Dr. Alexander; "Non-compact Roughness and 3D Topography Evaluation of grinded Wafers down to nm level", Dec. 1, 2010, 25 pgs.
(Continued)

*Primary Examiner* — Jonathan Hansen
(74) *Attorney, Agent, or Firm* — Taylor English Duma LLP (57) ABSTRACT

The invention relates to an optical measuring process for acquiring a surface topography of a measurement object. To this end, a measuring device with a measuring head in a measuring head guide device is provided for chromatic confocal acquisition of the surface topography or for spectral interferometric OCT acquisition of the distance to the surface topography. Firstly, spectrally broadband light of a light source from a fibre array with i fibres of i measurement spots is directed onto the measurement object via a common measuring head optic, with formation of a spot array of i measurement spots. i reflection spectra of the i measurement channels are then acquired and digitized. Finally, the digitized reflection spectra are evaluated with removal of time
(Continued)

variations of systematic measurement errors and time-related deviation movements of the measuring head guide device.

27 Claims, 6 Drawing Sheets

Related U.S. Application Data continuation of application No. PCT/IB2013/060127, filed on Nov. 14, 2013.

(56) References Cited

U.S. PATENT DOCUMENTS

| | | | |
|---|---|---|---|
| 5,392,124 A | 2/1995 | Barbee | |
| 5,532,815 A | 7/1996 | Kipman et al. | |
| 5,691,540 A | 11/1997 | Halle et al. | |
| 5,905,572 A | 5/1999 | Li | |
| 6,099,522 A | 8/2000 | Knopp et al. | |
| 6,396,069 B1 | 5/2002 | MacPherson et al. | |
| 6,672,943 B2 | 1/2004 | Vogtmann et al. | |
| 6,673,654 B2 | 1/2004 | Ohno et al. | |
| 6,686,270 B1 | 2/2004 | Subramanian et al. | |
| 6,768,552 B2 | 7/2004 | Takahashi et al. | |
| 6,806,969 B2 | 10/2004 | Clifford, Jr. et al. | |
| 6,887,126 B2 | 5/2005 | Brouillette et al. | |
| 6,897,964 B2 | 5/2005 | Takahashi et al. | |
| 7,271,916 B2 | 9/2007 | Jasapara et al. | |
| 7,306,696 B2 | 12/2007 | Lian et al. | |
| 7,307,735 B2 | 12/2007 | Hecht et al. | |
| 7,443,517 B2 | 10/2008 | Sawabe et al. | |
| 7,477,401 B2 | 1/2009 | Marx et al. | |
| 7,525,732 B2 | 4/2009 | Uehara et al. | |
| 7,652,774 B2 | 1/2010 | Lian et al. | |
| 7,705,995 B1 | 4/2010 | Johs et al. | |
| 7,738,113 B1 | 6/2010 | Marx et al. | |
| 7,826,068 B2 | 11/2010 | Czerkas | |
| 7,853,429 B2 | 12/2010 | Fettig et al. | |
| 8,716,039 B2 | 5/2014 | Dusemund | |
| 8,982,339 B2 | 3/2015 | Schonleber et al. | |
| 9,295,391 B1* | 3/2016 | Tearney | A61B 1/07 |
| 9,297,645 B2 | 3/2016 | Schonleber | |
| 9,494,409 B2 | 11/2016 | Schonleber | |
| 9,500,471 B2 | 11/2016 | Michelt | |
| 9,677,871 B2 | 6/2017 | Schonleber | |
| 2002/0153500 A1 | 10/2002 | Fordahl et al. | |
| 2003/0016353 A1 | 1/2003 | Detalle et al. | |
| 2003/0090671 A1 | 5/2003 | Takahashi et al. | |
| 2004/0021874 A1 | 2/2004 | Shimmick | |
| 2004/0185582 A1 | 9/2004 | Kueny | |
| 2004/0262529 A1 | 12/2004 | Yoshida et al. | |
| 2005/0003642 A1 | 1/2005 | Hecht et al. | |
| 2005/0073692 A1 | 4/2005 | De Groot | |
| 2005/0140981 A1 | 6/2005 | Waelti | |
| 2005/0237537 A1 | 10/2005 | Leizerson et al. | |
| 2005/0248771 A1 | 11/2005 | Eussen et al. | |
| 2006/0132790 A1* | 6/2006 | Gutin | A61B 5/0066 356/479 |
| 2006/0194419 A1 | 8/2006 | Araki | |
| 2007/0046948 A1 | 3/2007 | Podoleanu et al. | |
| 2007/0086018 A1 | 4/2007 | Shih et al. | |
| 2007/0148792 A1 | 6/2007 | Marx et al. | |
| 2007/0188765 A1 | 8/2007 | Zhao et al. | |
| 2007/0231717 A1 | 10/2007 | Rivers et al. | |
| 2007/0258095 A1 | 11/2007 | Oliver et al. | |
| 2008/0013078 A1 | 1/2008 | Podoleanu et al. | |
| 2008/0013960 A1 | 1/2008 | Tearney et al. | |
| 2008/0151237 A1 | 6/2008 | Lian et al. | |
| 2009/0031792 A1 | 2/2009 | Fan et al. | |
| 2009/0059239 A1 | 3/2009 | Hoffmann et al. | |
| 2009/0078888 A1 | 3/2009 | Mamba et al. | |
| 2009/0250635 A1 | 10/2009 | Sykora et al. | |
| 2009/0257065 A1 | 10/2009 | Hauger et al. | |
| 2009/0273782 A1 | 11/2009 | Yoo et al. | |
| 2010/0007894 A1 | 1/2010 | Suehira | |
| 2010/0051068 A1 | 3/2010 | Miyanari | |
| 2010/0110376 A1 | 5/2010 | Everett et al. | |
| 2010/0157308 A1 | 6/2010 | Xie | |
| 2010/0265493 A1 | 10/2010 | Jiang et al. | |
| 2010/0283842 A1 | 11/2010 | Guissin et al. | |
| 2010/0321671 A1 | 12/2010 | Marx et al. | |
| 2011/0085136 A1 | 4/2011 | Ferguson et al. | |
| 2011/0180521 A1 | 7/2011 | Quitter et al. | |
| 2011/0222070 A1 | 9/2011 | Nagai et al. | |
| 2011/0292375 A1 | 12/2011 | Marx et al. | |
| 2012/0050723 A1 | 3/2012 | Emtman et al. | |
| 2012/0238869 A1 | 9/2012 | Schmitt et al. | |
| 2012/0257207 A1 | 10/2012 | Marx et al. | |
| 2012/0257213 A1 | 10/2012 | Schonleber | |
| 2012/0320380 A1 | 12/2012 | Schonleber | |
| 2013/0034918 A1 | 2/2013 | Dusemund et al. | |
| 2013/0070732 A1 | 3/2013 | Noh et al. | |
| 2013/0120740 A1 | 5/2013 | Schonleber | |
| 2014/0368830 A1 | 12/2014 | Michelt | |
| 2015/0260504 A1 | 9/2015 | Schonleber | |

FOREIGN PATENT DOCUMENTS

| | | |
|---|---|---|
| CN | 102209878 | 10/2011 |
| DE | 19525770 | 8/1996 |
| DE | 69622943 | 3/2003 |
| DE | 10319843 | 4/2004 |
| DE | 102004011189 | 9/2005 |
| DE | 102004052205 | 5/2006 |
| DE | 102005036719 | 2/2007 |
| DE | 102005052743 | 5/2007 |
| DE | 102006034244 | 1/2008 |
| DE | 102008041062 | 4/2009 |
| DE | 102010000079 | 1/2010 |
| DE | 102008049821 | 4/2010 |
| DE | 102010016862 | 5/2010 |
| DE | 102010015944 | 7/2011 |
| DE | 102011081596 | 4/2012 |
| DE | 102011051146 | 10/2012 |
| DE | 102011055735 | 5/2013 |
| DE | 102012111008 | 5/2014 |
| EP | 0905476 | 3/1999 |
| EP | 1018632 | 7/2000 |
| EP | 1977850 | 10/2008 |
| EP | 2159535 | 3/2010 |
| FR | 2950441 | 3/2011 |
| GB | 1105819 | 3/1968 |
| JP | 6065963 | 4/1988 |
| KR | 1020080112436 | 12/2008 |
| TW | 200712585 | 4/2007 |
| TW | 200937005 | 9/2009 |
| WO | 1997027613 | 7/1997 |
| WO | 2006028926 | 3/2006 |
| WO | 2006084279 | 8/2006 |
| WO | 2007060441 | 5/2007 |
| WO | 2008010996 | 1/2008 |
| WO | 2011086490 | 7/2011 |
| WO | 2011141867 | 11/2011 |
| WO | 2013070732 | 5/2013 |
| WO | 2014076649 | 5/2014 |

OTHER PUBLICATIONS

Jakob, Dr. G., "Koaxiale Interferometrische Schichtdickenmessung", Optical Measuring, Sonderdruck aus Photonik Mar. 2000; 4 pgs.
ISIS Sentronics Gmbh Data Sheet, "StraDex a3 sensor"; 3 pgs.
Precitec Optronik Gmbh; French Preliminary Search Report and Written Opinion for serial No. FR1253225, dated Nov. 13, 2013, 10 pgs.
Niklaus, et al. "Adhesive Wafer Bonding", Journal of Applied Physics, Applied Physics Reviews—Focused Review, 2006, vol. 99, No. 1, pp. 031101.1-031101.28.
Rowland, et al. "Impact of polymer film thickness and cavity size on polymer flow during embossing: toward process design rules for nanoimprint lithography", Journal of Micromechanics and Microengineering, 2005, vol. 15, pp. 2414-2425.

(56) References Cited

OTHER PUBLICATIONS

Taiwan Office Action for serial No. 101121622, filed Jun. 15, 2012, dated May 21, 2014, 15 pgs.
Malta, D. et al.; "Fabrication of TSV-Based Silicon Interposers", RTI International, 6 pgs.
Lucke, et al.; Article entitled: "Mikrooptische Sensoren nach dem chromatisch konfokalen Messprinzip", Forschungszentrum Karlsruhe GmbH, Karlsruhe 2006, 22 pgs.
Micro-Epsilon USA; Brochure for Confocal Chromatic Measurement System, cited in the German Examination Report for serial No. 10 2014 008 584.8, dated Apr. 21, 2016, 11 pgs.
Micro-Epsilon; Article entitled: "New Generation of Confocal Measurement Technology", located at <http://www.microepsilon.com/press/release/PR231confocalDT/ index.html?sLang=us>, accessed on Jul. 7, 2016, 2 pgs.
Precitec Optronik Gmbh; German Examination Report for serial No. 102014008584.8, dated Apr. 21, 2016, 13 pgs.
Schoenleber; German Examination Report for serial No. DE102012102826, dated Sep. 28, 2012, 14 pgs.
Schonleber, Martin; Corrected Notice of Allowability for U.S. Appl. No. 13/440,434, filed Apr. 5, 2012, dated Mar. 1, 2016, 6 pgs.
Schonleber, Martin; Final Office Action for U.S. Appl. No. 13/440,434, filed Apr. 5, 2012, dated Feb. 10, 2014, 20 pgs.
Schonleber, Martin; Issue Notification for U.S. Appl. No. 13/440,434, filed Apr. 5, 2012, dated Mar. 9, 2016, 1 pg.
Schonleber, Martin; Non Final Office Action for U.S. Appl. No. 13/440,434, filed Apr. 5, 2012, dated Oct. 14, 2014, 16 pgs.
Schonleber, Martin; Non-Final Office Action for U.S. Appl. No. 13/440,434, filed Apr. 5, 2012, dated Jun. 25, 2015, 21 pgs.
Schonleber, Martin; Non-Final Office Action for U.S. Appl. No. 13/440,434, filed Apr. 5, 2012, dated Mar. 24, 2013, 34 pgs.
Schonleber, Martin; Notice of Allowance for U.S. Appl. No. 13/440,434, filed Apr. 5, 2012, dated Jan. 13, 2016, 11 pgs.
Schonleber, Martin; Notice of Allowance for U.S. Appl. No. 13/440,434, filed Apr. 5, 2012, dated Feb. 12, 2015, 9 pgs.
Schonleber, Martin; Notice of Allowance for U.S. Appl. No. 13/440,434, filed Apr. 5, 2012, dated Sep. 23, 2015, 11 pgs.
United Kingdom Search Report for U.S. Patent Application No. GB1105819.5, filed Apr. 6, 2011, dated Jul. 23, 2012, 4 pgs.
Dusemund, Claus; Issue Notification for U.S. Appl. No. 13/521,736, filed Jul. 11, 2012, dated Apr. 16, 2014, 1 pg.
Dusemund, Claus; Non-Final Office Action for U.S. Appl. No. 13/521,736, filed Jul. 11, 2012, dated Jul. 23, 2013, 18 pgs.
Dusemund, Claus; Notice of Allowance for U.S. Appl. No. 13/521,736, filed Jul. 11, 2012, dated Dec. 27, 2013, 8 pgs.
Dusemund; International Preliminary Report on Patentability for serial No. PCT/IB2011/050091, filed Jan. 10, 2011, dated Aug. 16, 2012, 14 pgs.
Dusemund; International Search Report and Written Opinion for serial No. PCT/IB2011/050091, filed Jan. 10, 2011, dated Apr. 12, 2011, 3 pgs.
Huang et al.; "Optical coherence tomography", Science, vol. 254, No. 5035, S. 1178-1181 (1991), 4 pgs.
Vakhtin et al.; "Common-path interferometer for frequency-domain optical coherence tomography"; Applied Optics, vol. 42, No. 34, S. 6953-6957 (2003), 6 pgs.
Precitec Optronik Gmbh; Extended European Search Report for serial No. EP12172165, dated Oct. 24, 2012, 5 pgs.
Precitec Optronik Gmbh; Korean Notice of Preliminary Rejection for serial No. 10-2012-0064923, filed Jun. 18, 2012, dated Oct. 30, 2014, 11 pgs.
Schonleber, Martin; Applicant Interview Summary for U.S. Appl. No. 13/525,184, filed Jun. 15, 2012, dated Oct. 27, 2015, 3 pgs.
Schonleber, Martin; Final Office Action for U.S. Appl. No. 13/525,184, filed Jun. 15, 2012, dated Oct. 7, 2014, 17 pgs.
Schonleber, Martin; Final Office Action for U.S. Appl. No. 13/525,184, filed Jun. 15, 2012, dated Jul. 28, 2015, 32 pgs.
Schonleber, Martin; Issue Notification for U.S. Appl. No. 13/525,184, filed Jun. 15, 2012, dated Oct. 26, 2016, 1 pg.
Schonleber, Martin; Non-Final Office Action for U.S. Appl. No. 13/525,184, filed Jun. 15, 2012, dated Feb. 25, 2014, 16 pgs.
Schonleber, Martin; Non-Final Office Action for U.S. Appl. No. 13/525,184, filed Jun. 15, 2012, dated Dec. 31, 2015, 21 pgs.
Schonleber, Martin; Non-Final Office Action for U.S. Appl. No. 13/525,184, filed Jun. 15, 2012, dated Feb. 19, 2015, 21 pgs.
Schonleber, Martin; Notice of Allowance for U.S. Appl. No. 13/525,184, filed Jun. 15, 2012, dated Jul. 12, 2016, 21 pgs.
Schonleber; German Examination Report for serial No. DE102011051146, filed Oct. 4, 2012, dated Jan. 19, 2012, 6 pgs.
Schonleber, Martin; Final Office Action for U.S. Appl. No. 13/667,809, filed Nov. 2, 2012, dated Sep. 16, 2013, 9 pgs.
Schonleber, Martin; Issue Notification for U.S. Appl. No. 13/667,809, filed Nov. 2, 2012, dated Feb. 25, 2015, 1 pg.
Schonleber, Martin; Non-Final Office Action for U.S. Appl. No. 13/667,809, filed Nov. 2, 2012, dated Apr. 15, 2013; 12 pgs.
Schonleber, Martin; Non-Final Office Action for U.S. Appl. No. 13/667,809, filed Nov. 2, 2012, dated Apr. 24, 2014; 8 pgs.
Schonleber, Martin; Notice of Allowance for U.S. Appl. No. 13/667,809, filed Nov. 2, 2012, dated Dec. 4, 2014, 10 pgs.
Schonleber; International Preliminary Report on Patentability for serial No. PCT/IB2011/052048 filed May 10, 2011, dated Nov. 22, 2012, 7 pgs.
Schonleber; International Search Report and Written Opinion for serial No. PCT/IB2011/052048 filed May 10, 2011, dated Sep. 21, 2011, 2 pgs.
Michelt, Berthold; Applicant Initiated Interview Summary for U.S. Appl. No. 14/307,481, filed Jun. 17, 2014, dated Jul. 1, 2016, 3 pgs.
Michelt, Berthold; Applicant Interview Summary for U.S. Appl. No. 14/307,481, filed Jun. 17, 2014, dated Nov. 20, 2015, 3 pgs.
Michelt, Berthold; Final Office Action for U.S. Appl. No. 14/307,481, filed Jun. 17, 2014, dated Feb. 12, 2016, 24 pgs.
Michelt, Berthold; Issue Notification for U.S. Appl. No. 14/307,481, filed Jun. 17, 2014, dated Nov. 2, 2016, 1 pg.
Michelt, Berthold; Non-Final Office Action for U.S. Appl. No. 14/307,481, filed Jun. 17, 2014, dated Aug. 26, 2015, 41 pgs.
Michelt, Berthold; Notice of Allowance for U.S. Appl. No. 14/307,481, filed Jun. 17, 2014, dated Jul. 25, 2016, 20 pgs.
Precitec Optronic Gmbh; International Search Report and Written Opinion for serial No. PCT/IB2014/062290, filed Jun. 17, 2014, dated Sep. 22, 2014, 20 pgs.
Chinese Office Action for serial No. 201380059958.1, filed Nov. 14, 2013, dated Oct. 9, 2016, 11 pgs.
German Examination Report for serial No. 102012111008.5, filed Nov. 15, 2012 , dated Jun. 19, 2013, 17 pgs.
Schonleber, Martin Notice of Allowance for U.S. Appl. No. 14/713,150, filed May 15, 2015, dated Feb. 9, 2017, 16 pgs.
Schonleber, Martin; International Search Report and Written Opinion for PCT/IB2013/060127, filed Nov. 14, 2013, dated Mar. 21, 2014, 27 pgs.
Schonleber, Martin; Issue Notification for U.S. Appl. No. 14/713,150, filed May 15, 2015, dated May 24, 2017; 1 pg.
Schonleber, Martin; Non-Final Office Action for U.S. Appl. No. 14/713,150, filed May 15, 2015, dated Sep. 6, 2016; 50 pgs.
German Examination Report for German Application No. DE102013010030.5, filed Jun. 17, 2013, dated Feb. 28, 2014, 12 pgs.

\* cited by examiner

OPTICAL MEASURING METHOD AND MEASURING DEVICE HAVING A MEASURING HEAD FOR CAPTURING A SURFACE TOPOGRAPHY BY CALIBRATING THE ORIENTATION OF THE MEASURING HEAD

REFERENCE TO RELATED APPLICATIONS

This application is a continuation of U.S. patent application Ser. No. 14/713,150, filed May 15, 2015, which is a continuation of International Application No. PCT/IB2013/060127 filed Nov. 14, 2013, which claims priority to German Application No. 10 2012 111 008.5, filed Nov. 15, 2012, each of which are hereby specifically incorporated by referenced herein in their entireties.

BRIEF DESCRIPTION OF THE DRAWINGS

The invention is explained in greater detail below with reference to the attached figures.

DETAILED DESCRIPTION

The invention relates to an optical measuring process for acquiring a surface topography of a measurement object. For this purpose, a measuring device with a measuring head is provided in a measuring head guide device for acquiring the surface topography.

Such a measuring device for measuring a surface is known from publication DE 10 2008 041 062 A1. The known measuring device generates a measuring light beam which, after passing through at least three separately focussing optical components, strikes the surface of the object, is reflected by it and is detected by a spatially resolving light detector together with reference light following interferential superposition.

To achieve this, the known measuring device has an optical assembly which comprises the at least three separately focussing optical components. The main axes of these separately focussing optical components are offset in relation to one another and arranged side by side. Furthermore, the known measuring device has a beam splitter positioned in a beam path of the measuring light beam. In addition, a reference face and a spatially resolving light detector are provided for the known device.

The light source, the beam splitter and the optical assembly are arranged in relation to one another such that measuring light emitted by the light source and passing through the focussing optical components strikes the surface, is reflected by it and strikes the detector via the focussing optical components. In addition, the known measuring device has an evaluation system for receiving image data from the spatially resolving light detector and for outputting measurement data which represents a surface shape of the surface. To this end, distance values representing a distance between a location on the surface and the focussing optical components are acquired. From these distance values the evaluation system forms parameters which represent the surface shape of the surface.

In addition, the above publication discloses a process for measuring a surface of an object that, in essence, comprises the following steps. First, a measuring light is generated. From this measuring light are formed three converging partial beams of a first part of the measuring light to light three regions of the surface of the object that are positioned a distance from one another. The reflected light or the three partial beams of the light reflected by the surface are directed together with a second part of the measuring light towards a spatially resolving detector in order to create interferences. Finally, these interferences are analysed by a detector that detects light intensities in order to represent the surface shape of the surface of the object by means of corresponding measurement data.

A disadvantage of the known device is that it requires considerable space because its optical components are arranged separately and side by side. A further disadvantage lies in the fact that no precautions are taken to take into account systematic measurement errors, long-term changes in the absolute distance measurement or deviations from a reference path followed by the measurement object in the known embodiment in any way during the evaluation or to correct the measurement results accordingly. In consequence, the known measurement system is unable to provide reliable data, in particular in the nanometre range, for acquiring surface topographies of such dimensions.

In this context, chromatic confocal distance measuring technique is understood to mean a process which uses the effect whereby lenses have different focal points for different wavelengths of light. Chromatic confocal distance measurement uses the dispersion of spectrally broadband light in an optical imaging system to determine the distance from a reflecting surface to the measuring head. A spectrally broadband point light source, which usually takes the form of a first pinhole diaphragm or an optical fibre end, is focussed on the object with the optical imaging system. Here the distance from the focus to the imaging system is a clear, permanently defined function of the wavelength. The reflected light is imaged again and by the same imaging system, decoupled by the lighting beam path and projected onto a pinhole diaphragm positioned at the mirror point of a beam splitter. Alternatively, the reflected light can also be fed back directly into the first pinhole diaphragm and then decoupled. A detector behind the pinhole diaphragm then determines the dominant wavelength of the reflected light. From the knowledge of the focal lengths of the individual wavelengths it is possible to determine the object distance directly from the dominant wavelength. An advantage of this process is the absence of moving components. In a preferred embodiment, the light from the light source is coupled into an optical fibre, passes through a fibre coupler and exits the measuring head at a fibre end. The light returning from the measurement object enters the fibre end again and is diverted towards the detector at the fibre coupler. Here the fibre end forms both the light point for lighting the object and the pinhole diaphragm for filtering the measurement light.

Optical coherence tomography (OCT) denotes an examination process in which spectrally broadband light is used to measure the distance between objects with the aid of an interferometer. In this process, the object being examined is point-scanned. An arm with a known optical path length is used as a reference to a measuring arm. The interference of the partial waves from the two arms results in a pattern from which it is possible to read the difference between the optical path lengths of the two arms. Two interferometric measurement and evaluation processes are distinguished: "time domain" OCT and "frequency domain" OCT. They involve on one hand a time domain (TD) signal and on the other a frequency domain (FD) signal. In simple terms, this means either that the length of the frequency arm is changed and the intensity of the interference is measured continuously without taking the spectrum into account (time domain), or that the interference of the individual spectral components is acquired (frequency domain).

An object of the invention is to provide an optical measurement process for acquiring surface topographies of a measurement object with which it is possible to improve measuring accuracy into the nanometre range, and to create a suitable measuring device for this process.

This object is achieved with the subject-matter of the independent claims. Advantageous developments are detailed in the dependent claims.

In a first aspect of the invention, an optical measuring process in provided for acquiring a surface topography of a measurement object, in particular in the nanometre range. To this end, a measuring device with a measuring head in a measuring head guide device is provided for chromatic confocal acquisition of the surface topography or for spectral interferometric OCT acquisition of the distance to the surface topography.

First, spectrally broadband light from a light source of a fibre array with i fibres from i measurement channels is directed onto the measurement object via a common measuring head optic, with formation of a spot array of i measurement spots. i reflection spectra of the i measurement channels are then acquired and digitized. The reflection spectra of each measurement channel are then evaluated individually and a distance value is determined. The totality of the distance values at different measurement channels and times are then evaluated in combination in order to remove time variations in systematic measurement errors and time-related deviation movements.

An advantage of this measuring process lies in the fact that the measurement values indicated for a local surface topography are checked for time variations in systematic errors and for time-related deviation movements of the measuring head guide device so that a real surface topography can be separated from real data on measurement errors and deviation movements of the measuring head guide device.

This necessitates a plurality of evaluation steps which individually require the acquiring of geometric distance values of the i measurement channels at a time t(j). Three-dimensional position values for the i measurement spots on the measurement object surface at time t(j) are also acquired. A local inclination of the measurement object surface relative to the measuring head is also acquired. Time variations in systematic measurement errors based on the inclination acquired are then correlated. This step is followed by the creation of local topographies for the redundant i measurement channels.

Lastly, the local topographies are correlated with time-related deviation movements of the measuring head guide device being separated by separating inconsistent positions and orientations of the measuring head and/or the resulting scan lines of the measurement light in the individual measurement channels due to the measuring head guide device from the real/true surface topography with a measurement value resolution in the nanometre range. Finally, an adjusted surface topography and a real track and orientation of the measuring head guide device of the measuring head is output. These evaluation steps are determined by comparison with the different scanning values.

It is generally possible to scan at different clock speeds or to scan in a line with the measurement spots arranged in the direction of scanning at different intervals in order to avoid artefacts due to underscanning.

A further technique is used to determine a local inclination of the measurement object surface relative to the measuring head by means of three measurement spots, these three measurement spots preferably being arranged on the measurement object surface in an isosceles triangle. Here a normal vector of the triangle representing the local inclination can be determined from distance values in the triangle and then, for example, the inclination error of the measuring head guide device can be determined and removed using an evaluation table.

A further variant for correcting the measurement values consists in mounting a three-dimensional acceleration sensor on the measuring head guide device or the measuring head and acquiring three dimensionally and in situ the time-related deviation movements with which the measurement values of the surface topography measurement are then corrected accordingly.

Furthermore, it is possible using a vector model to acquire measuring head movements at the measuring head guide device by means of the vectorial determination of the yawing, pitching or rolling of the measuring head. In this context, yawing means the pivoting of the measuring head about its vertical axis, pitching means the pivoting of the measuring head about its lateral axis and rolling occurs when the measuring head pivots about its longitudinal axis.

It is also possible to determine local slopes of the measurement object surface by calculating the difference in height between i measurement spots and integrating the totality of the local slopes into a surface topography.

This differential scanning process measures path differences between two measurement spots of a measuring head with one fibre end and the measurement spots of two focussing lenses. The difference in optical path to the two measurement spots is measured to derive a surface topography by means of spectral interferometry (OCT).

A further aspect of the invention relates to an optical precision measuring device for acquiring a surface topography of a measurement object, in particular in the nanometre range. To this end, the precision measuring device has a device with a measuring head in a measuring head guide device for chromatic confocal acquisition of the surface topography or for acquisition of the distance to the surface topography using spectral interferometric OCT. i spectrally broadband light sources to supply i fibres with broadband light via Y-couplers can be provided in the measuring device. It is also possible to supply i fibres with a single broadband light source via an 1Xi-coupler and then further i Y-couplers.

A fibre array with the i fibres for i measurement channels is arranged in the measuring head. In addition, a common measuring head optic which forms the spot array with i measurement spots on the measurement object is also present in the measuring head. Means for acquiring and digitizing i reflection spectra of the i measurement channels in i spectrometers are also provided. Moreover, the optical precision measuring device also has an evaluation unit for the digitized i reflection spectra for removing time variations in systematic measurement errors and time-related deviation movements of the measuring head guide device. In this optical precision measuring device the measuring head moves along a linear reference path on a measuring head guide device moves.

In addition to an option for multi-channel detection with i spectrometers, a spectrometer with a fibre array input can be provided and detection can be performed by selecting several spectra with a matrix CCD. It is also possible, as described below in reference to an embodiment, to use a single spectrometer with time channel multiplexing. As an alternative to the time multiplexer, it is also possible to combine several measurement channels in one spectrum. Here the measuring head is designed in such a way that the distance values of the channels assume a fixed order of priority with the smallest value always being acquired by channel 1, the next largest value by channel 2 and so on. This process can be used for both a chromatic confocal measurement with spectral peak position and for an OCT measurement with peak position in a Fourier transformation of the equalised spectrum.

However, it is also possible to provide a guide device for the measurement object which guides the measurement object along under a fixed measuring head. In both cases, the movable components of the measuring head guide devices are subject to time-related deviation movements in relation to the set-point position. Time-related system errors such as time-variable inclinations of the measuring head in relation to the orthogonals to the measurement object surface can also occur. They can be determined with the aid of the measures described above, for example by the positioning of three measurement spots in an isosceles triangle, and corrected in accordance with the measurement values. Instead of a plurality of i reflection spectra, the i measurement channels can also be fed to a multiplexer, acquired in a single spectrometer and then digitized.

The optical precision measuring device also has the following means for removing time variations of systematic measurement errors and time-related deviation movements of the measuring head guide device from the i reflection spectra. Means designed to acquire geometric distance values of the i measurement channels at time t(j) and means designed to acquire three-dimensional position values for the i measurement spots on the measurement object surface at time t(j) are provided. Further means of acquisition serve to determine a local inclination of the measurement object surface relative to the measuring head. To acquire the local inclination, the measuring device has means designed to correct time variations in systematic measurement errors based on the inclination acquired. Furthermore, means designed to create local topographies for the redundant i measurement channels are also provided.

Lastly, means are designed to correlate the local topographies with the true surface topography being separated from time-related deviation movements of the measuring head guide device by separating time-related inconsistent positions and time-related inconsistent orientations of the measuring head in the measuring head guide device. Finally, means designed to output an adjusted surface topography and further means designed to output a real track and a real orientation of the measuring head guide device are provided.

The aforementioned means are combined in the evaluation unit to determine i real measurement values from the i reference spectra on i points on the measurement object and to separate time variations in measurement system errors and time-related movement deviations from the real precision measurement value in order to extract a measurement value on the nano scale. An extremely precise measurement value is thus extracted from the measured raw data of the i spectrometers in an advantageous manner with the aid of this precision measuring device, the shell simultaneously supplying a real value for the size of the time-related measurement system errors and for the size of the time-related deviation movements of the measurement guide device.

Figure 1:
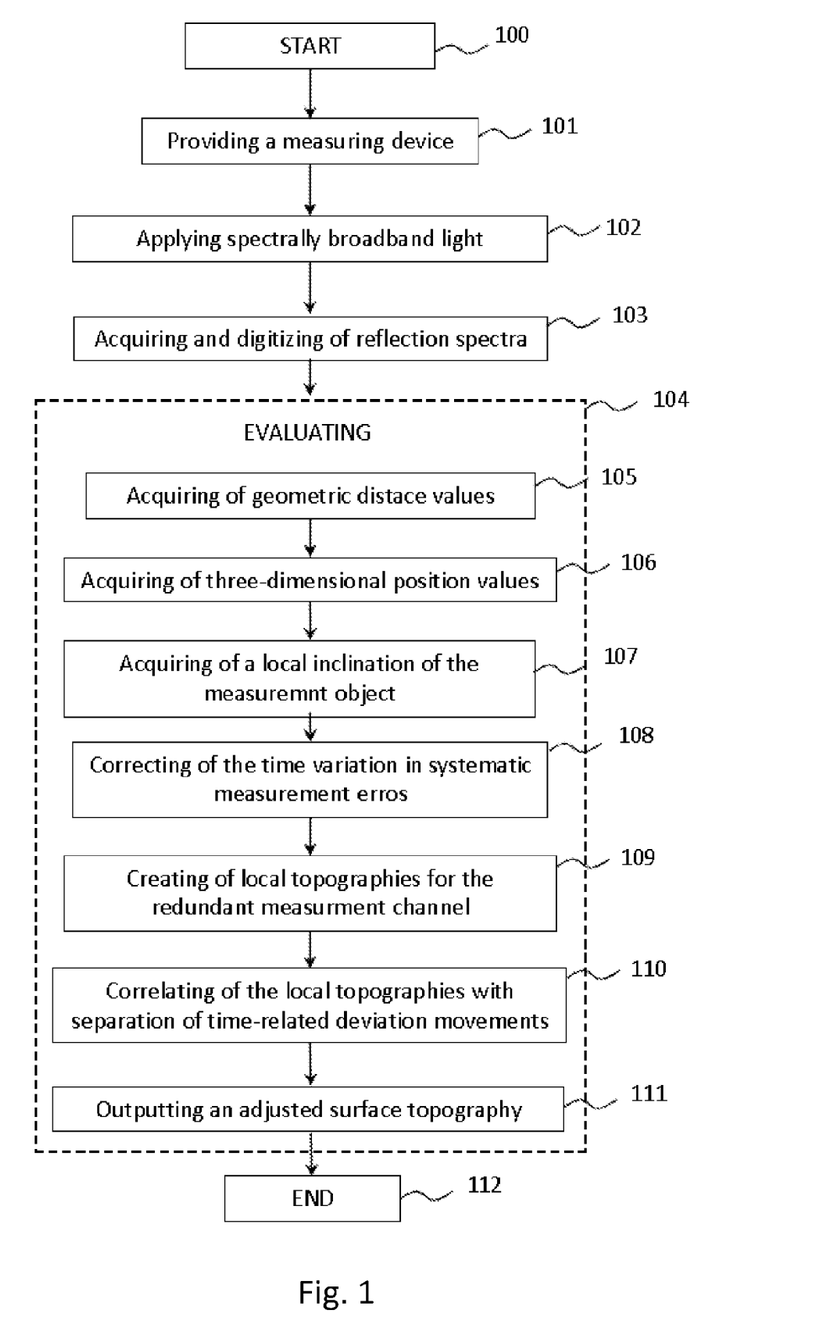
FIG. 1 shows schematically a flow diagram of an optical measurement process for acquiring a surface topography in accordance with a first embodiment of the invention.

FIG. 1 shows schematically a flow diagram 50 of an optical measurement process in the nanometre range for acquiring a surface topography in accordance with a first embodiment of the invention. The optical measurement process starts at start block 100.

In step 101 a measuring device with a measuring head in a measuring head guide device for chromatic confocal acquisition of the surface topography or for spectral interferometric OCT acquisition of the distance to the surface topography is provided, and a measuring head in the measuring head guide device is passed over the measurement object. It is followed by step 102 in which spectrally broadband light from a light comprising a fibre array with i fibres of i measurement channels is applied to the measurement object via a common measuring head optic with formation of a spot array of i measurement spots as the measuring head is passed over the measurement object. In the process, position values of the actuator and the measurement values of the i measurement channels are time-stamped and recorded.

In this process, the position values of the actuator can be determined as follows:

a) A target value is used for the controlled measuring head position, where applicable taking into account reproducible time-related track deviations previously determined in a calibration run.

b) Real position values of actuator elements measured with encoders are used. The encoder values are based on glass scales or strain gauges or optical interferometers.

c) Measurement values from acceleration sensors are integrated and correlated with the position values determined under a) and b) above.

d) Distance differences between two measurement points are measured directly and integrated to a topography which his not been distorted by jumps of the measuring head.

In step 103, i reflection spectra of the i measurement channels are acquired and digitized. Finally, in the box edged with a dot-dashed line, comes the multi-element step 104 for evaluating the digitized reflection spectra with the removal of time variations in systematic measurement errors and time-related deviation movements of the measuring head guide device.

This evaluation in step 104 comprises a step 105 for acquiring geometric distance values of the i measurement channels at time t(j). The subsequent step 106 involves the acquisition of three-dimensional position values for the i measurement spots on the measurement object surface at time t(j). This enables step 107, in which a local inclination of the measurement object surface relative to the measuring head is acquired, to take place before the evaluation process moves on to step 108 in which time variations in systematic measurement errors based on the inclination measured are correlated.

Step 109 serves to acquire local topographies for the redundant i measurement channels. It is followed by step 110 comprising a correlation of the local topographies in which time-related deviation movements of the measuring head guide device are removed by separating inconsistencies in sensor selection and inconsistencies in sensor orientation of the measuring head in the measuring head guide device from the true surface topography. Finally, in step 111, an adjusted surface topography and a real track and orientation of the measuring head guide device of the measuring head are output so that the process can terminated in with step 112.

Figure 2:
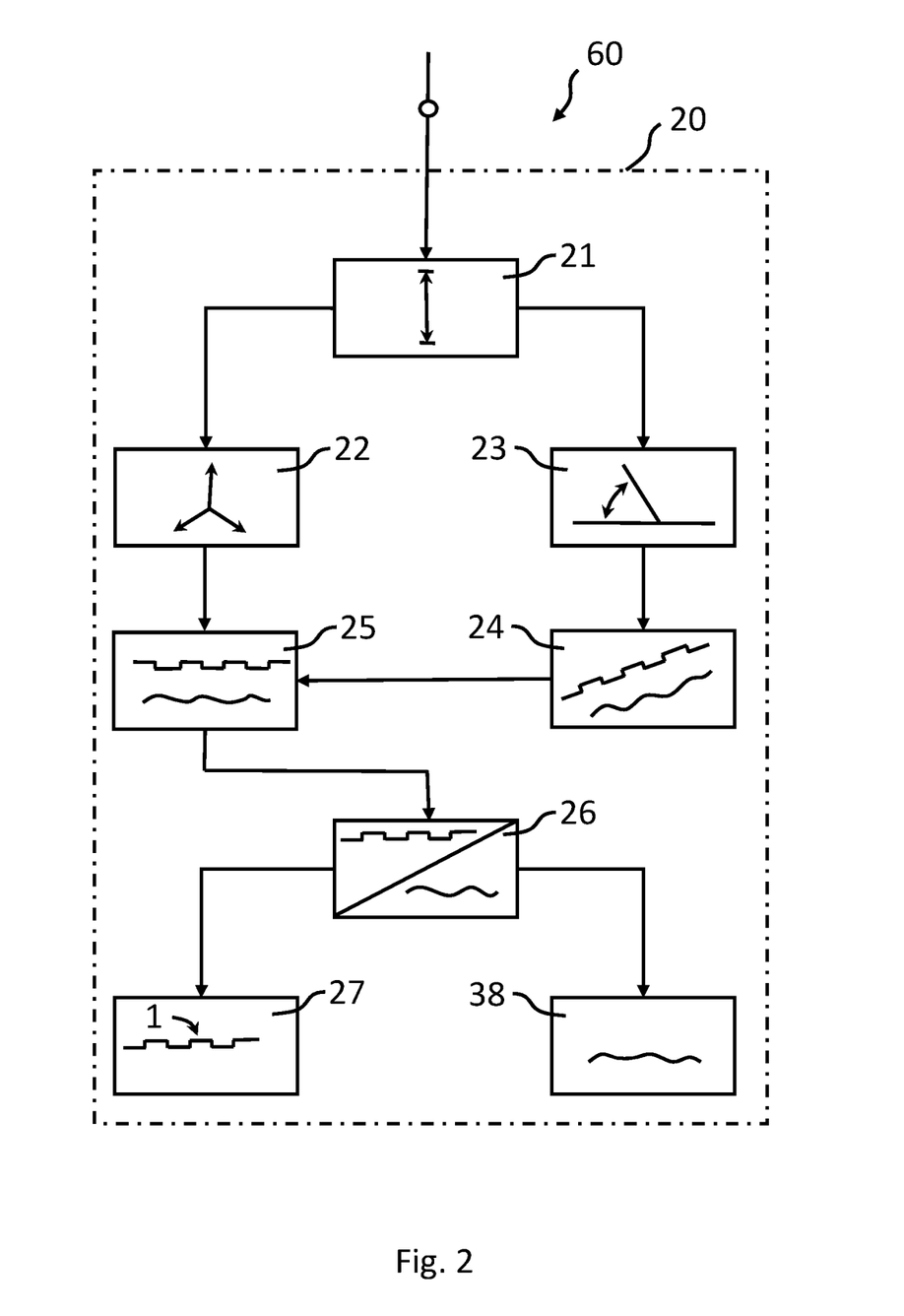
FIG. 2 shows schematically a block diagram of an evaluation unit of a measuring device for precision measurement in accordance with the first embodiment.

FIG. 2 shows schematically a block diagram 60 of an evaluation unit 20 which is required in a measuring device for precision measurement in a nanometre range in accordance with the first embodiment. In a first block, the evaluation unit 20 acquires a means 21 designed to acquire geometric distance values of the i measurement channels at time t(j). The means 21 in this block works together with means 22 and 23, the means 22 being designed to acquire three-dimensional position values for the i measurement spots on the measurement object surface at time t(j) and the means 23 in the neighbouring block to acquire a local inclination of the measurement object surface relative to the measuring head.

Means 23 is followed by a block containing the means 24 that is designed to allocate the acquired inclination to time variations in systematic measurement errors with correlation of time patterns. The means 25 is designed to take into account the measurement errors when creating local topographies for the redundant i measurement channels.

Means 25 is followed by the block containing the means 26 which is designed to correlate the local topographies with removal of time-related deviation movements of the measuring head guide device by separating inconsistencies of a sensor track sensor track and inconsistencies of a sensor orientation of the measuring head in the measuring head guide device from the true surface topography. Finally, means 26 has two output blocks, one containing the means 27 which is designed to output an adjusted surface topography and the other containing the means 38 which is designed to output a real track and a real orientation of the measuring head guide device.

Figure 3:
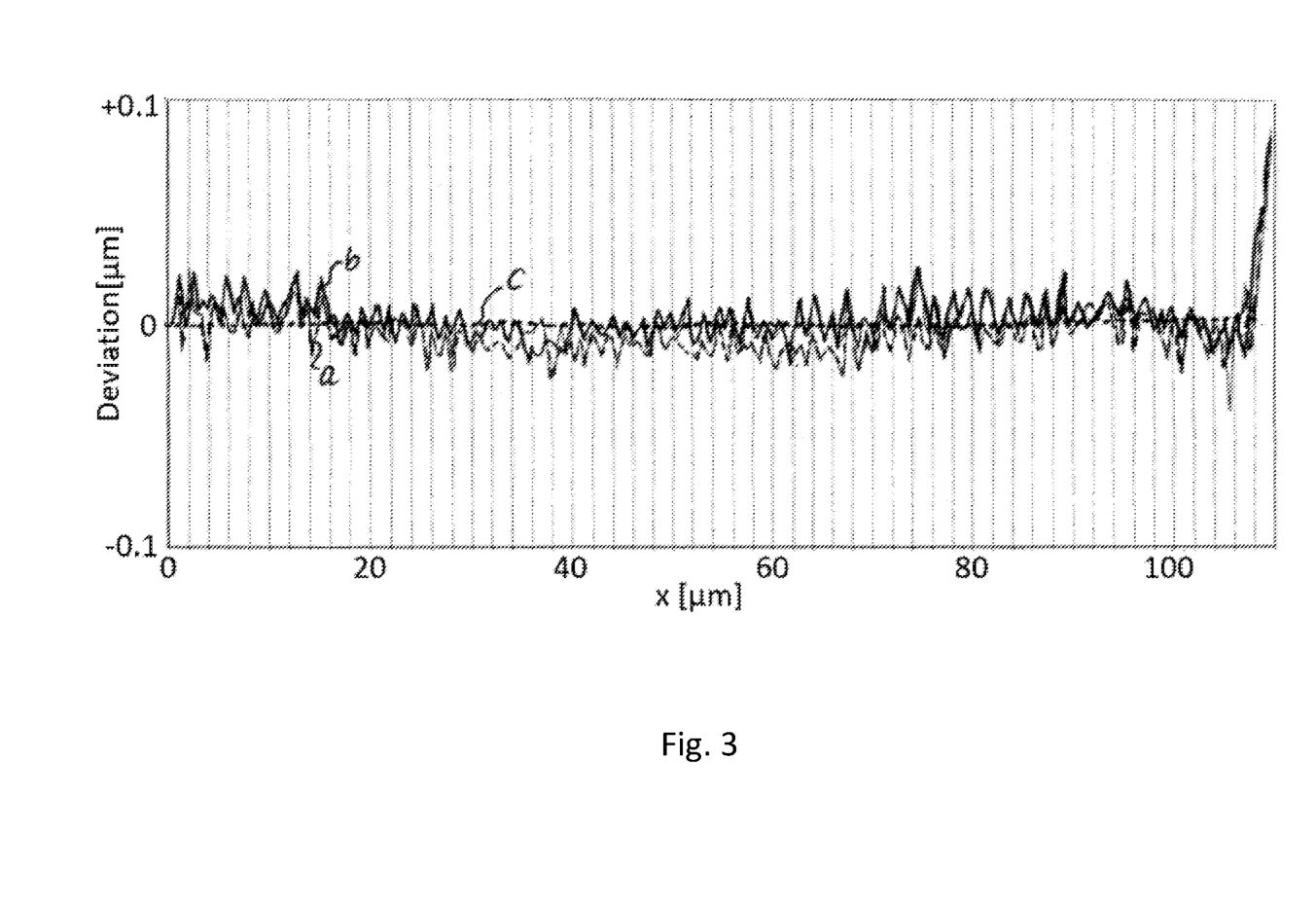
FIG. 3 shows by way of example a measurement result of a calibration run for a chromatic confocal measuring head.
Figures 4, 4A, 4B, 4C:
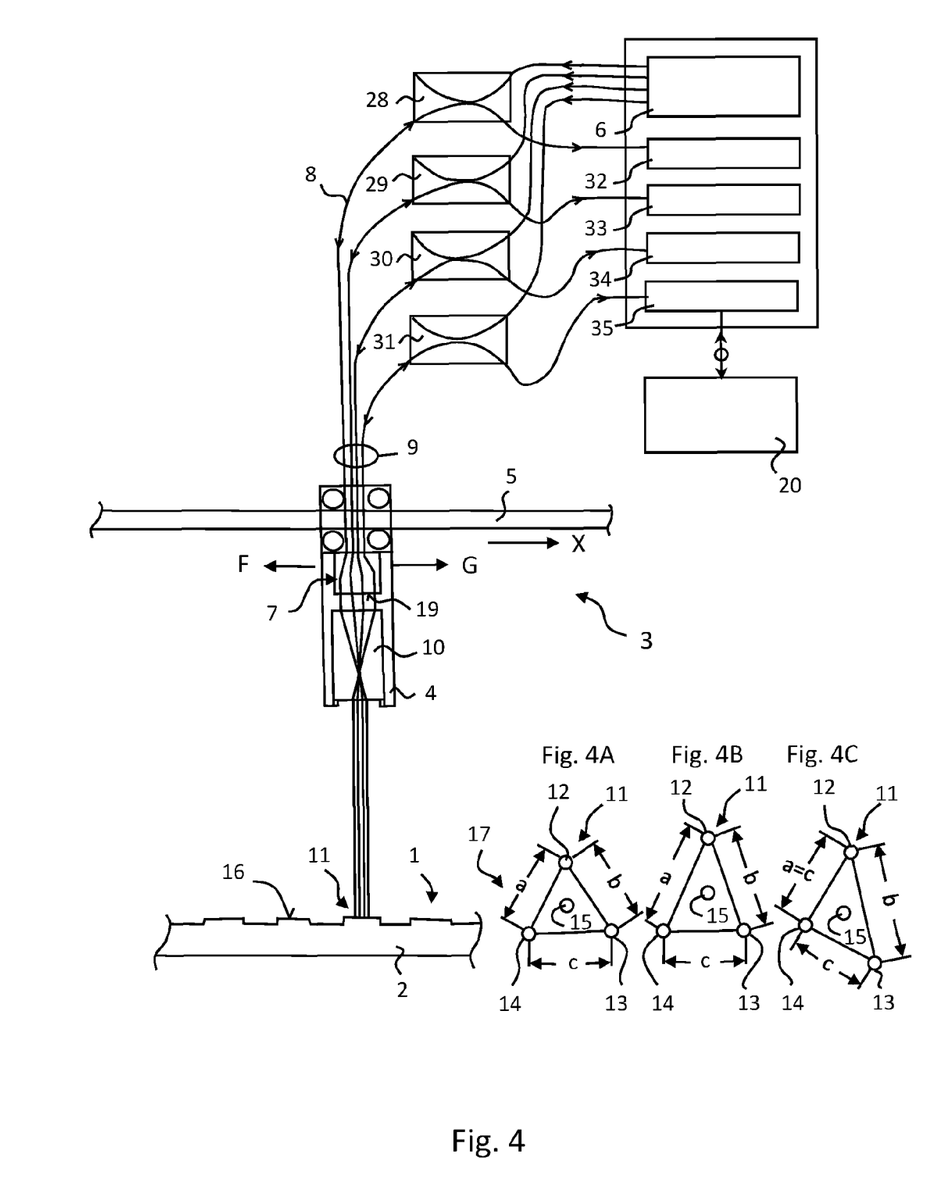
FIG. 4 shows a schematic diagram of a measuring device for measuring a surface topography in accordance with an embodiment of the invention.
Figures 5, 5A, 5B, 5C:
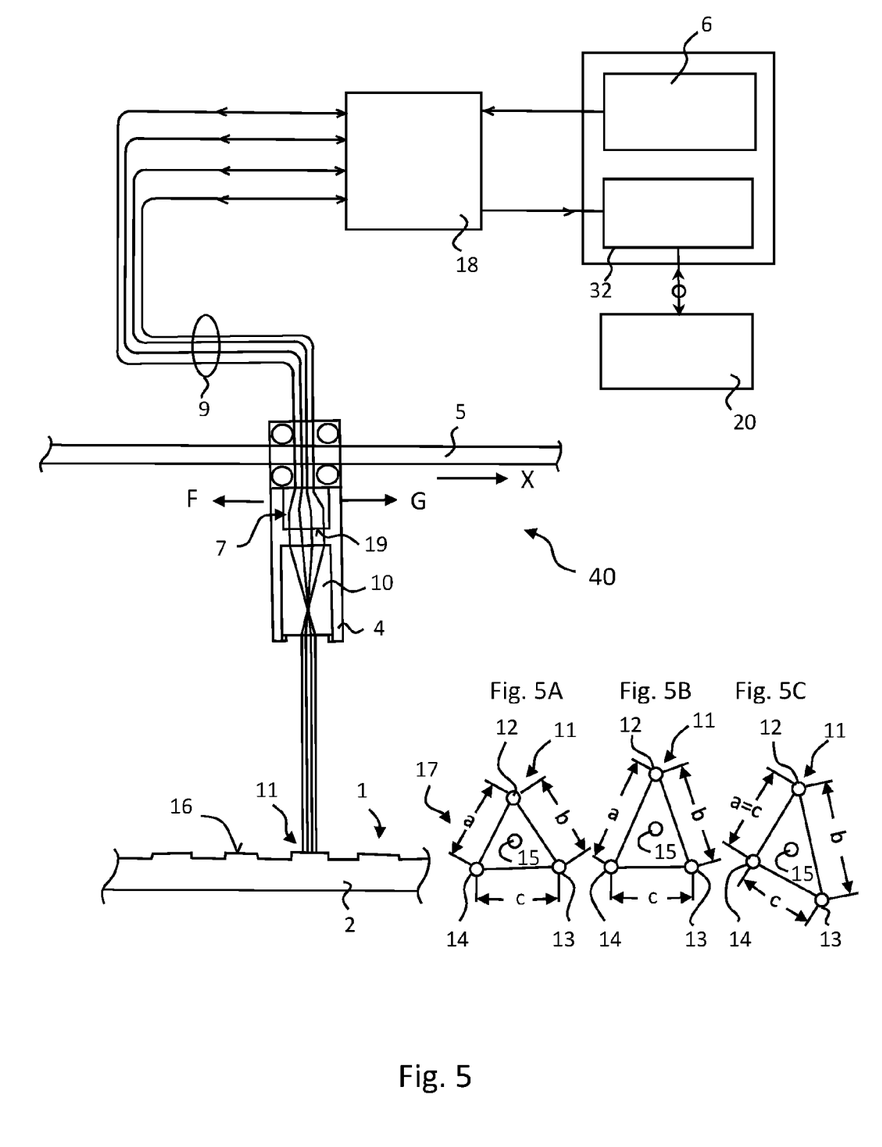
FIG. 5 shows a schematic diagram of a measuring device for measuring a surface topography in accordance with a further embodiment of the invention.

FIG. 3 shows the measurement result of a calibration run for a chromatic confocal measuring head. As shown in FIGS. 4 and 5 below, in this calibration run the measuring head of the measuring device is directed towards an optical flat mounted on a linear table. The relative distance from the optical flat to the measuring head can be measured to an accuracy in the nanometre range using a control interferometer. The calibration run determines the relationship between spectrometer signal in the form of the peak position of the spectral maximum and distance. This can be performed across the whole of the spectral range of the spectrometer. This determines the "distance over pixel position" curve valid for the combination of spectrometer and measuring head.

The diagram shown in FIG. 3 gives the time-related deviation of actual value from expected value in two repeated measurements. For this purpose it shows a range of ±0.1 deviation over a measurement range of 100 μm (micrometres) as a function of path and time. The diagram in FIG. 3 shows the effects described below. The broken-line curve a is generally a few nanometres lower than the continuous-line curve b, corresponding to a time-related long-term drift of the working distance due to temperature influence, for example. The curves show a rough waviness of ±10 nm in comparison to the calibration run of the time-related long-term drift of the measurement range, as shown by the dotted-line curve c. The two curves a and b have a dominant periodicity of 2 μm and are fairly closely correlated with one another. A smoothing filter that removes fine-wave periodicities can be used to determine a curve such as the dotted-line curve c. Such periodicities can occur due to tilting movements of the travel axis or various changes in distance at the control interferometer or at the measuring head, or represent a time-variable systematic behaviour of the measuring head or the evaluation unit which is then smoothed out when the curve is drawn.

The remaining fine-wave time-related deviations between the two curves a and b are due partly to measurement value noise, partly to other time-related vibrations and fluctuations of the measurement setup and the control interferometer distance measurement. With the process previously discussed in relation to FIGS. 1 and 2 and the following measuring devices 3 and 40, it is possible, in a profile measurement with nanometre precision, to distinguish between these various interference factors, namely long-term drift, time variations in systematic measurement errors of the distance sensor, position errors of positioning axes, vibrations of the measurement object and measurement value noise, and to remove them from the profile of the measurement object.

To this end, in accordance with the invention, an optical measuring head with a plurality of measurement channels is provided as shown in FIGS. 4 and 5 below, the foci of the spots of the measurement channels being arranged at least along a direction of scanning referred to as the main line. During scanning, the profile of the measuring object is measured in each measurement channel and the totality of the profiles, which are offset in terms of both time and position, are combined to form a mean total profile using correlation processes.

As the profile deviations in the individual channels should be similar in all profiles due to time and spatial movement patterns, it is possible to remove deviation movements of the measuring head guide device and time variations in systematic measurement errors from the profiles, and statistical noise can be reduced by measuring the adjusted surface topography several times. Here even the providing at least one additional measurement channel at right angles to the main line, as shown by way of example in FIGS. 4A to 4C and 5A to 5C below, can serve to measure and remove time-related tilting movements of the measuring head at the measuring head guide device.

It is also possible to calculate local slopes in the surface in order to remove systematic measurement errors of the measuring head dependent on the inclination of the object surface. For this purpose it is, for example, possible to calculate the time-related phase position of the measurement signals of two channels and thus determine a time-related differential phase. The differential phase can be converted back into a local difference in height as a slope between two measurement points. In addition, further measurement channels can be interferometrically superposed to measure the optimum path difference corresponding to the differential phase. It is possible to integrate a topography from the totality of the local slopes. This differential scanning is in competition with the absolute topography acquisition obtained from the ideal actuator track and the measured distance values.

This error corrections process also works on strongly inclined surfaces where the quality of the spectral interferometric distance measurement is impaired by time-related changes in distance. It therefore provides a robust measurement for chromatic confocal acquisition of the surface topography.

As mentioned above, a measurement spot arranged at right angles to the main line is sufficient to remove a measurement system error associated with an inclination of the measuring head in relation to the orthogonals of the measurement object surface. However, the inclination or angle of inclination can be determined even more accurately if three, rather than one, measurement spots are arranged at right angles to the main line so as to form an equilateral triangle as shown in FIGS. 4A and 5A below, it being possible to remove any inclination by setting up the normal vector of the triangle.

In addition to deviation due to an angle of inclination which can be equated to a time-related direction of pivoting or rotation angle about a longitudinal axis in the direction of travel, is also referred to as the angle of roll $\Phi$, there are further time-related orientation deviations that are referred to as pitching and characterise an angle of rotation $\Theta$ about the lateral axis of the measuring head guide device or measuring head. A third possible direction of rotation is yawing, also referred to as the angle of rotation $\Psi$ about the vertical axis. The three solid angles of time-related orientation deviations during scanning, namely $\Psi$, $\Theta$ and $\Phi$, are all known as Euler or positional angles.

The transformation matrix for the time-related orientation deviation thus comprises the three individual rotation matrices for the angles in question. In the transformation matrices below, the sequence of rotation is given in the sequence $\Psi$, $\Theta$ and $\Phi$.

$$M_{fg} = \begin{pmatrix} 1 & 0 & 0 \\ 0 & \cos\Phi & \sin\Phi \\ 0 & -\sin\Phi & \cos\Phi \end{pmatrix} \begin{pmatrix} \cos\Theta & 0 & -\sin\Theta \\ 0 & 1 & 0 \\ \sin\Theta & 0 & \cos\Theta \end{pmatrix} \begin{pmatrix} \cos\Psi & \sin\Psi & 0 \\ -\sin\Psi & \cos\Psi & 0 \\ 0 & 0 & 1 \end{pmatrix}$$

$$= \begin{pmatrix} \cos\Theta\cos\Psi & \cos\Theta\sin\Psi & -\sin\Theta \\ \sin\Phi\sin\Theta\sin\Psi - \cos\Phi\sin\Psi & \sin\Phi\sin\Theta\sin\Psi - \cos\Phi\cos\Psi & \sin\Phi\cos\Theta \\ \cos\Phi\cos\Theta\cos\Psi + \sin\Phi\sin\Psi & \cos\Phi\sin\Theta\sin\Psi - \sin\Phi\cos\Psi & \cos\Phi\cos\Theta \end{pmatrix}$$

In linearized form with angles given in radian measure the transformation matrix takes the following form:

$$D = \begin{bmatrix} 1 & \Psi & -\Theta \\ -\Psi + \Phi * \Theta & 1 + \Phi * \Theta * \Psi & \Phi \\ \Theta & -\Phi + \Theta * \Psi & 1 \end{bmatrix}$$

If the product terms are disregarded, as is possible when the measurement head guide device has good actuators, this gives the simplified rotation matrix:

$$D = \begin{bmatrix} 1 & \Psi & -\Theta \\ -\Psi & 1 & \Phi \\ \Theta & -\Phi & 1 \end{bmatrix}$$

Thus a unit matrix plus an antisymmetrical matrix can be used in the three Euler angles as vector models of the time-related orientation deviation.

Here it is important to note that such actuators or measuring head guide devices frequently represent a link between track deviations and orientation deviations. For a wavy track, a rigid guide results in a z(x) or a time-related wavy course of orientation with the pitch angle $\Theta$. With a rigid guide, the measuring head always follows parallel to the guide such that $\Theta$ (theta) corresponds to the slope of the measuring head guide device, where:

Theta(x=(d/dx)z(x)

A measuring head that is fixed rigidly to such a measuring head guide therefore follows the changes in orientation in the ratio 1:1 such that its track r1(x) follows the track r0(x) of a point of contact according to:

r1(x)=r0(x)+D(x)*R1 so that the relative track deviation movement is r1(x)−r0(x)=D(x)*R1.

The movement of the point of contact is therefore fully described by:
z(x) or theta(x)
y(x) or psi(x)
phi(x).
The missing angles of such a rotation matrix are:

theta(x)=(d/dx)z(x)

psi(x)=(d/dx)y(x).

With the precision measuring device, the track parameter is not x, but the variable time t=x/v corresponding to the patch travelled s.

So, if the lever vector R1 between contact point and measuring point is known, the position error at the measuring point can be deduced from the orientation at the measuring point.

If the guide for the measuring head guide device is not a rigid guide but rather a sprung guide with a given delay and a given attenuation, the time-related movement equation for a forced attenuated oscillation with a deflection of x(t) applies.

M x″(t)+i M omega0 x′(t)+M omega0^2*x(t)=F(t)

with the constraint force

F(t)=M x0(t)″.

Here F' stands for the derivation of F after time t.

This means that with a sprung guide of the measuring head on the measuring head guide device the response to a guide wave is phase-shifted with modified amplitude. The spring parameters are the resonance frequency omega and the attenuation.

For longwave deviation movements of the measuring head guide device or the measuring head, this time-related deviation movement is transferred in a ratio of 1:1. If the time-related deviation movement is close to a resonance frequency, this leads to more or less strongly elevated time-related deviation movements with approx. 90° phase shift. With shortwave time-related deviation movements, however, these are integrated away.

Thus a measurement run with frequency analysis of the measured distance values provides information on the natural oscillations of the actuators and the measuring head holder of the measuring head guide device. Non-optimum adjustment of the scan run can even lead to resonant time-related deviation movements. Here the amplitude of a resonant deviation movement may depend on the position of the measuring head in relation to a part-actuator.

However, lateral deviation movements become visible only when structured objects are measured, in which case a straight lattice will look wavy. As discussed above, pivoting about the vertical axis or yawing is impossible to detect on a vertical plane mirror. However, deviation movements in axial direction are clearly visible and pitching about the lateral axis and rolling about the longitudinal axis therefore result in waves in the apparent topography. With the multi-channel measurement in accordance with the invention, it is therefore possible to distinguish between pitching and rolling caused by the measuring head guide device.

Further possible correction methods result from the fact that, as shown in FIGS. 4A, 4B and 4C and 5A, 5B and 5C below, redundant measuring points can be arranged at different distances from one another. This prevents periodic fluctuations in the topography with a period length of less than $T1$ = distance 1/speed of travel from being perceived as underscanned spatial frequencies. Comparison with a measuring point with a distance 2>distance 1 shows the difference immediately.

In addition, it is also possible to use measuring points with different frequencies to detect underscanning in the time range. To achieve this it is sufficient simply to perform time scanning at two different clock speeds.

Furthermore, it is possible to compensate for measurement errors by inclining the object. For this purpose the measuring head is calibrated by carrying out distance measurements on a precision sphere. The deviation of the measured topography from the reference form is then determined and a table of deviations in relation to object inclinations is drawn up. For this purpose, the measuring head will preferably project at least three measuring points, as shown in FIGS. 4A, 4B, 4C and 5A, 5B, 5C below, which ideally form an equilateral triangle 17, as shown in FIGS. 4A and 5A below, onto the measurement object so that a local inclination of the object surface can be determined from the normal vector of the triangle. Measurement evaluation comprises merely the calculation of a local object inclination, it being possible to correct the measured distance with the aid of the "deviation over object inclination" table.

Furthermore, the time-related deviations illustrated in FIG. 3 can be adjusted to remove time variations in systematic measurement errors by using acceleration sensors to acquire time-related lateral movements of the measuring head. The acceleration sensors measure the movement of the measuring head in relation to the space at right angles to the optical axis (in directions x and y) and integrate this acceleration into a time-related track deviation dx(t) dy(t). This can also be done in direction z. In the process, the multi-channel measuring head measures the local object inclination, as shown in FIGS. 4 and 5. The measuring points can be corrected either by interpolation of the object surface at points lying on the reference track, thus allowing the distance values to be corrected, or the surface coordinates (x, y and z) can be indicated with the measured track X=X_ref+ dX instead of the reference track X_ref(t)=[x_ref(t), y_ref (t)].

A vibration with amplitude x0 and frequency f gives an acceleration amplitude of:

$$a0 = x0 * \text{omega}^2$$
$$= 4\text{pi}^2 * x * f^2$$

where omega=2 pi*f. The conversion factor for the conversion of the acceleration a as a multiple of the gravitational acceleration g=9.81 m/s² is therefore:

$F$=4pi²/(9.81 ms-2)/(1 μm)/(1 Hz)²=4.02*10⁻⁶ and thus:

$A0$(in g)=x0 (in μm)*f(in Hz)^2*4 millionths.

Table of acceleration values at typical vibrations in multiples of gravitational acceleration g

|  | 10 Hz | 100 Hz | 1000 Hz |
|---|---|---|---|
| 1 nm |  | 4e−5 | 0.004 |
| 10 nm |  | 4e−4 | 0.04 |
| 100 nm |  | 0.004 | 0.4 |
| 1 μm | 4e−4 | 0.04 | 4 |
| 10 μm | 0.004 | 0.4 | 40 |

Orientation vibrations can be used to work back to position vibrations. To this end, the orientation vibrations measured with the multi-point measuring head in accordance with FIGS. 4 and 5 are sorted according to components of the typical natural oscillations of the actuators. A geometric model indicates the relationship between measuring head orientation and measuring head position relative to the actuators for the natural oscillations. It is determined by means of a calibration procedure. In the subsequent measurement evaluation the measured orientation deflection is converted, separately for natural oscillations and based on the geometric model, into measuring head position deflection. The measuring head position deflection determined in this way is then used to correct the coordinates of the measured points on the object surface.

To enable underscanned waves to be acquired, it is possible not to keep the distance from the measuring points in a spatial direction constant so that periodic waves can be detected during underscanning. In addition, as indicated above, provision is made to make the measuring cadence for different measuring points different so that periodic waves can also be detected during underscanning in this way.

FIG. 4 shows a schematic diagram of a measuring device 3 for precision measurement of a surface topography 1 in accordance with an embodiment of a precision measuring device in the nanometre range. For this purpose, the measuring device 3 has a measuring head 4 in a measuring head guide device 5 for chromatic confocal acquisition of the surface topography 1 or for spectral interferometric OCT acquisition of the distance between a measuring head optic 10 of the measuring head 4 and a measurement object surface 16.

The measuring head 4 can be supplied by a spectrally broadband light source, a so-called SOA (Solid-state Optical Amplifier).

However a Super Luminescence Diode (DLS) derived from the SAO light source is preferably used. The super continuum light source of the SLD has more output per bandwidth. It therefore makes a suitable single light source, it being possible to split its light into many channels using a 1Xi-coupler.

A variable-wavelength light source with time-sequential spectrum recording can also be used as an alternative to a broadband light source in conjunction with a line spectrometer. However, additional time-delay effects may occur in this case.

In the embodiment in accordance with FIG. 4, the broadband light of an SLD light source 6 is coupled into fibres 8 of an optical fibre bundle which in this embodiment has four optical fibres, for example, via four Y-couplers 28, 29, 30 and 31.

The broadband light of the SLD light source 6 is thus split into the four optical fibres and fed to the measuring head 4 in the measuring head guide device 5.

Fibre ends 19 form a fibre array 7 via a measuring head optic 10 and the measuring head optic 10 projects a spot array 11 onto a measurement object surface 16 which is then reflected back and fed via the Y-couplers 28, 29, 30 and 31 to four spectrometers 32, 33, 34 and 35. The reflection spectra formed in the spectrometers 32, 33, 34 and 35 can then be evaluated by an evaluation unit 20 so as to separate time variations in system errors and time-related deviation movements of the measuring head guide device and the measuring head from the surface topography to be measured.

To permit such correction of the measurement values when separating out measurement errors, further measurement spots 12, 13 and 14, which form the spot array 11, are arranged at right angles to a central measurement spot 15 on a main line of the scanning directions x and/or F and G, the three measurement spots 12, 13 and 14 forming an equilateral triangle at right angles to the main line if, for example, the inclination angle or the angle of rotation Φ about the longitudinal axis x of the measuring head guide device 5 is zero, as shown in FIG. 4A.

If this inclination or roll angle is not zero but deviates from the zero position, the triangle formed by the measurement spots 12, 13 and 14 can be distorted, as shown in FIG. 4B. From this distortion it is possible, for example, to calculate a normal vector of the triangle and thus an angle of inclination using the distances between the measurement spots 12, 13 and 14, and thus to correct the measurement value for the surface topography. To this end, the inclination of the object can be used to correct distance values of all measuring points or one inclination can be determined for each measuring point from local topographies. While the measurement spot 12 deviates extremely from the main line in FIG. 4B, FIG. 4C shows another distortion of the equilateral triangle, as shown originally with FIG. 4A, in which both the measurement spot 12 and the measurement spot 13 are offset by zero in relation to the positions of a roll angle.

This inclination or roll angle Φ is just one example of a system error. As already discussed in reference to the vector model of the time-related deviation movements, the same applies for the other two Euler angles, namely the yaw angle Ψ for rotation about the vertical axis z and the pitch angle Θ for rotation about the lateral axis y.

FIG. 5 shows a schematic diagram of a measuring device 40 for precision measurement of a surface topography 1 in accordance with a further embodiment of the invention. Components with functions identical to those in FIG. 4 are indicated by the same reference numerals and will not be discussed further here.

The embodiment in accordance with FIG. 5 differs from the embodiment in accordance with FIG. 4 in the use of a multiplexer 18 with which measurement channels 9 are fed to a single spectrometer 32 with a time lag, the multiplexer 18 allowing that the number of spectrometers shown in FIG. 4 to be reduced. As a result of the multiplexer 18, it is also possible to do without the Y-couplers shown in FIG. 4 since the broadband light source 6 can also be coupled into the individual optical fibres with a time lag by the multiplexer 18. An advantage is that rather than the light intensity being split by the number of optical fibres, each individual optical fibre receives the full light intensity from the multiplexer 18.

Figure 6:
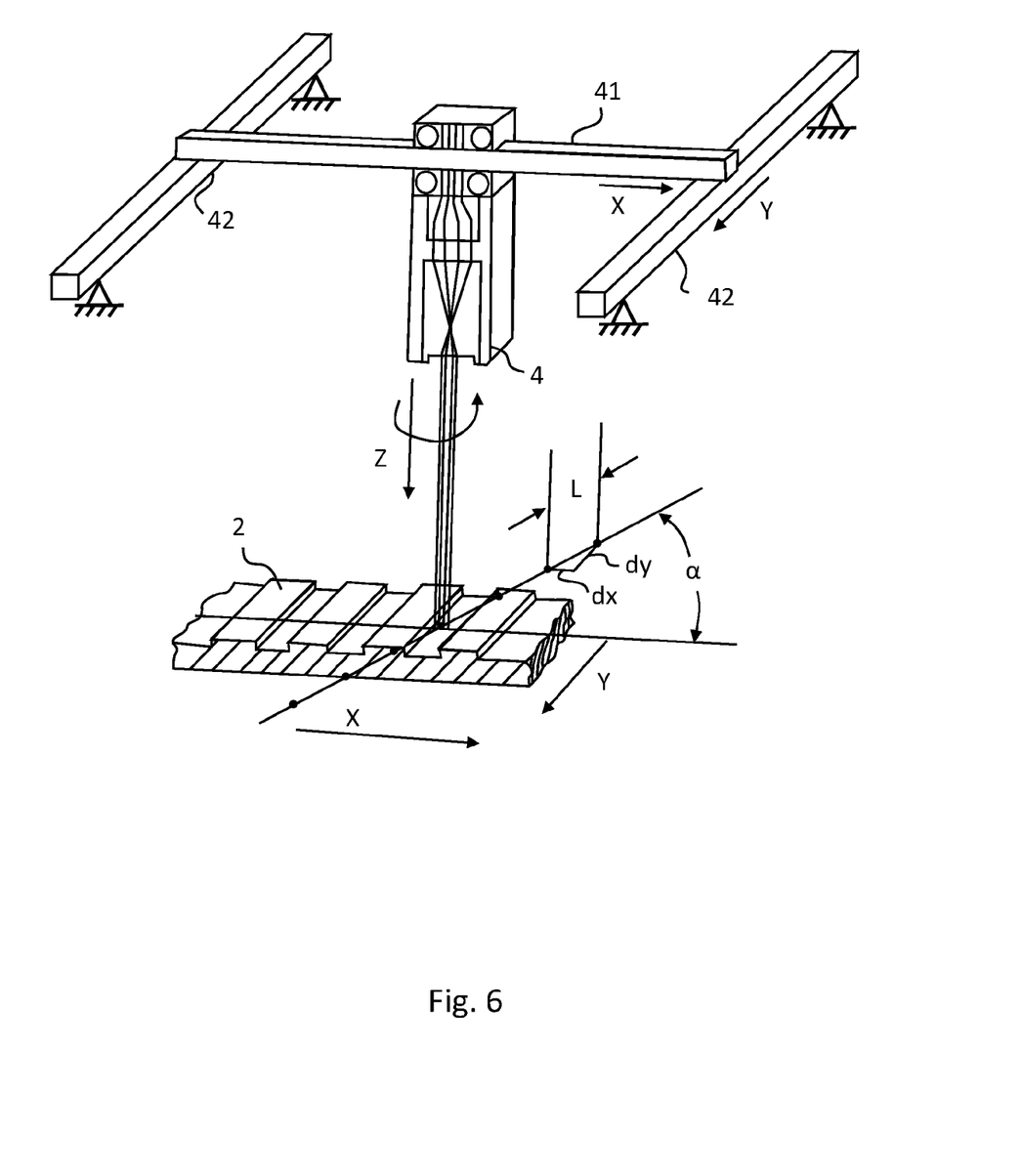
FIG. 6 shows a schematic diagram of a measurement section to explain a further embodiment of the measurement process.

FIG. 6 shows a schematic diagram of a measurement section to explain a further embodiment of the measurement process in which a typical use of an optical line sensor on Cartesian axes of travel is described as a special example. The principle here is to measure the same surface points several times with a line sensor in several measurement runs with crossed linear axes and in so doing to remove the two interference factors in the profile measurement in the form of vibrations and deterministic jolting of the x-axis that can be determined with one or more calibration run.

To this end, as shown in FIG. 6, an optical measuring head 4 passes through several measuring points that are arranged equidistantly on a line at a distance L and which measure a distance in direction z. An actuator comprising a linear positioner 41 in direction x on an x-axis and a positioner 42 in direction y on a y-axis, moves either the measurement object 2 or the measuring head 4. Here x and y as axes of travel are preferably arranged perpendicular in relation to one another. A measuring head holder is provided with which the measuring head 4 can be rotated about the z-axis such that the line of measuring points slopes axis at an angle a in relation to the x-axis.

FIG. 6 also shows that the measurement object 2 is arranged in the coordinate system, essentially in a plane spanned by the x- and the y-axis.

To perform the exemplary measurement process, the measuring head 4 travels at an even speed $vx=dx/dt$ in direction x. The section dx is covered every sensor measurement cycle dt while the y-axis remains fixed. The sensor takes a measurement at times $t=M*dt+t0*N$. The positions of the x- and y-axes are:

$$X(M)=dx*M$$

$$Y(N)=dy*M$$

Each measuring point i follows the axis positions and supplies a measured distance profile z mess(i,M,N) in an equidistant grid where:

$$X(i,M,N)=DX*i+M*dx$$

$$Y(I,M,N)=DY*i+N*dy$$

and where $$DX=L*\cos(\mathrm{alpha})$$

$$DY=L*\sin(\mathrm{alpha}).$$

The position of the x-axis is then:

$$X(M)=dx*M.$$

A curve z(X) which barely changes from run to run is assumed for the track deviation of the x-axis.

At the end of the line, the x-axis is returned to the starting position and the y-axis is offset by an amount $$YSTEP=di*DY$$

with whole-number di.

The same point (x,y) is now measured not in the data set (i,M,N) but rather in a data set (i−di,M−dM,N+1) where $$di=YSTEP/DY$$

$$dM=DX/dx.$$

Here the measurement value comprises topography (z0), axis jolts (zx,zy) and vibrations zt such that:

$$z(i, M, N)=z0(x, y)+zx(M)+zy(N)+zt(t1),$$

$$z(i-di, M-dM, N+1)=z0(x,y)+zx(M-dM)+zy(N+1)+zt(t2).$$

The following assumptions are made:
1) the measuring point i and the measuring point i−di measure the same distance,
2) the x-axis error can be reproduced sufficiently accurately on neighbouring runs and is not therefore dependent on N, and
3) the y-axis error is constant during a scanning run and is not therefore dependent on M.

Under these assumptions, it is possible to make the following evaluation in which, firstly, the difference in the measured distance z(x,y) between two neighbouring line scans N and N+1 is calculated:

$$Z(i, M, N) - z(i - di, M - dM, N + 1) =$$
$$dz = zx(M) - zx(M - dM) + zy(N) - zy(N + 1) + zt(t1) - zt(t2).$$

The sum is then obtained via dz of M=1 to M0 using the aforementioned assumptions 1 to 3:

$$dz(M)0 = \sum_{(m1=1,dM)} zx(m) -$$
$$\sum_{(m1-1,dM)} zx(M0 + m) + M0 * dm * [zy)N) - zy(N + 1)] +$$
$$\sum_{(t=t0*N \cdot K\, t0*N+M*dt)} zt(t) - \sum_{(t=t0*(N+1)K\, t0*(N+1)K\, t)*+M*dt)} zt(t)$$

Here the expression in the first line comprises a sum of the first pixels, which is constant, less a sliding mean value of dM points to the axis rappel zx(m).

This gives, in the second line, a difference in the axis error of the y-axis weighted with the number dM and increasing linearly with M. Finally, the third line gives a time sum of oscillation deflections. Since the oscillation moves around 0, this can hardly be greater than the sum of a half oscillation period.

While the form of this time slice is different at each N, zx_mean(m) changes only slightly over many Ns.

Thus it can be expected to be possible, when considering several Ns, to extract or filter out the course of zx. The time slice can be extracted or filtered out by forming a mean value of several line scans with noise-type vibration patterns and a band stop filter can be used with periodic vibration patterns, it being necessary to ensure that topographies with identical periods are not flattened out.

In addition, in a subsequent step a profile consisting of several overlapping parts can be assembled to form an overall profile in direction y, also referred to as "stitching". To this end, the overlapping profiles of two neighbouring runs, z(i,N) and z(i−di, N+1), are aligned and considered fit parameters for the y-axis error (zy(N)−zy(N+1)) and its incline in direction i.

A person skilled in the art can perform a plurality of variations of this embodiment without leaving the scope of protection of the attached claims. So, for example, the axes may deviate from Cartesian perpendicularity. Moreover, instead of a rotation of the measuring head 4 about the z-axis it is possible to generate a rotational movement about the y-axis, as in the case of a printing cylinder, as the measurement object. Interpolation can also be performed in the case of imperfect overlap. In addition, special vibration elimination cases are possible in which α=0. In this case (α=0), a maximum number of redundant profiles is obtained with imax=number of measuring points in the measuring head. Here adding up all measuring points i gives the imax-multiple of three time slices, namely a current oscillation deflection, a mean topography value and a mean axis error value, whereby, as indicated above, both the mean topography value and the mean axis error value hardly change at all.

The process according to the invention and the device according to the invention are therefore very well suited to measuring surface topographies in the micrometre and nanometre range. In particular, the process according to the invention and the device according to the invention can be used for qualitative and/or quantitative acquisition of the roughness, waviness, evenness and porosity of metallic and non-metallic surfaces.

They may be considered, in particular, for the surfaces of metallic precision workpieces in the mechanical engineering sector such as turbine blades and clutch and gearbox components, for example.

Moreover, they can be used to acquire the qualitative and quantitative surface topographies of optical components such as aspherical precision glass bodies. Such precision glass bodies may be provided with vacuum-applied multiple-layer systems using metals and/or dielectric materials.

Furthermore, the process according to the invention and the device according to the invention can also be used in the field of medical technology, in particular in the field of ophthalmology, for example, in the qualitative and quantitative acquisition of the surface topography of the cornea.

Although at least one exemplary performance of the process has been given in the description above, various changes and modifications can be made. The versions of the precision process specified are provided by way of example only and are not intended to limit the scope of validity, applicability or configuration in any manner. In fact, the description given above is intended to provide the person skilled in the art with the teaching required to implement at least one version of the process by way of example, it being possible to make numerous changes in the function and arrangement of the elements described in further exemplary embodiments of a measuring device without leaving the scope of protection of the attached claims and their legal equivalents.

LIST OF REFERENCE NUMERALS

1 Surface topography
2 Measurement object
3 Measuring device
4 Measuring head
5 Measuring head guide arrangement
6 Light source
7 Fibre array
8 Fibre
9 Measurement channel
10 Measuring head optic
11 Spot array
12 Measurement spot
13 Measurement spot
14 Measurement spot
15 Measurement spot
16 Measurement object surface
17 Equilateral triangle
18 Multiplexer
19 Fibre end
20 Evaluation unit
21 Means
22 Means
23 Means 24 Means
25 Means
26 Means
27 Means
28 Y-coupler
29 Y-coupler
30 Y-coupler
31 Y-coupler
32 Spectrometer
33 Spectrometer
34 Spectrometer
35 Spectrometer
38 Means
40 Measuring device (second embodiment of the invention)
41 Direction x positioner
42 Direction y positioner
50 Flow diagram
60 Block diagram
100 Start block
101 Step
102 Step
103 Step
104 Step
105 Step
106 Step
107 Step
108 Step
109 Step
110 Step
111 Step
112 Step That which is claimed is:

1. An optical measuring process for acquiring a surface topography of a measurement object comprising the following steps:
providing a measuring device with a plurality of measurement channels, i being a value equal to a total number of the measurement channels, with a measuring head in a measuring head guide device for chromatic confocal acquisition of the surface topography;
applying spectrally broadband light of a light source from a fibre array with i fibres of i measurement channels via a common measuring head optic, with formation of a spot array of i measurement spots on the measurement object, the i measurement spots comprising a group of four measurement spots, the group of four measurement spots comprising three measurement spots arranged in a triangle for acquiring a local inclination of the measurement surface relative to the measuring head and a central measurement spot, the central measurement spot being arranged within the triangle formed by the three measurement spots;
acquiring and digitizing of i reflection spectra of the i measurement channels; and
evaluating the digitized reflection spectra with removal of time variations in systematic measurement errors and time-related deviation movements of the measuring head guide device based on the acquired local inclination of the measurement surface relative to the measuring head.

2. The optical measuring process in accordance with claim 1, whereby the following evaluation steps are also performed to remove time variations in systematic measurement errors and time-related deviation movements of the measuring head guide device:
acquiring of geometric distance values (a, b, c) of the i measurement channels at time t(j);
acquiring of three-dimensional position values for the i measurement spots on a measurement object surface at time t(j);
acquiring of a local inclination of the measurement object surface relative to the measuring head;
correcting of time variations in systematic measurement errors based on the acquired inclination;
creating of local topographies for the redundant i measurement channels;
correlating of the local topographies with separation of time-related deviation movements of the measuring head guide device by separating inconsistencies of a sensor track and inconsistencies of a sensor orientation of the measuring head in the measuring head guide device from the true surface topography; and
outputting an adjusted surface topography and a real track and orientation of the measuring head guide device of the measuring head.

3. The optical measuring process in accordance with claim 1, whereby the time-related deviation movements of the measuring head guide device are acquired by means of a three-dimensional acceleration sensor on the measuring head and the measurement values of the surface topography are corrected accordingly.

4. The optical measuring process in accordance with claim 1, whereby to acquire the local inclination of the measurement object surface relative to the measuring head at least three measurement spots of an equilateral triangle are projected onto the measuring object surface and the inclination is determined from distance values between the measurement spots.

5. The optical measuring process in accordance with claim 1, whereby using a vector model measuring head movements are acquired by means of determining the yawing, pitching, and rolling of the measurement head on the measuring head guide device.

6. The optical measuring process in accordance with claim 1, whereby a differential scanning process comprising the following steps is used:
determining of local slopes of the measurement object surface by calculating the difference in height between i measurement spots; and
integrating the totality of the local slopes into a surface topography.

7. The optical measuring process in accordance with claim 1, whereby measurement spots arranged in a line in the direction of scanning are positioned at different distances.

8. The optical measuring process in accordance with claim 1, whereby consecutive scanning pulses follow one another at different time intervals.

9. The optical measuring process in accordance with claim 1, whereby the measurement spots are scanned at different clock speeds.

10. An optical measuring process for acquiring a surface topography of a measurement object comprising the following steps:
providing a measuring device with a plurality of measurement channels, i being the number of the measurement channels, with a measuring head in a measuring head guide device for spectral interferometric OCT acquisition of the distance to the surface topography;
applying spectrally broadband light of a light source from a fibre array with i fibres of i measurement channels via a common measuring head optic with formation of a spot array of i measurement spots on the measurement object, the i measurement spots comprising a group of four measurement spots, the group of four measurement spots comprising three measurement spots arranged in a triangle for acquiring a local inclination of the measurement surface relative to the measuring head and a central measurement spot, the central measurement spot being arranged within the triangle formed by the three measurement spots;

acquiring and digitization of i reflection spectra of the i measurement channels; and evaluating the digitized reflection spectra with removal of time variations in systematic measurement errors and time-related deviation movements of the measuring head guide device based on the acquired local inclination of the measurement surface relative to the measuring head.

11. The optical measuring process in accordance with claim 10, whereby the following evaluation steps are also performed to remove time variations in systematic measurement errors and time-related deviation movements of the measuring head guide device:

acquiring of geometric distance values (a, b, c) of the i measurement channels at time t(j);

acquiring of three-dimensional position values for the i measurement spots on a measurement object surface at time t(j);

acquiring of a local inclination of the measurement object surface relative to the measuring head;

correcting of time variations in systematic measurement errors based on the acquired inclination;

creating of local topographies for the redundant i measurement channels;

correlating of the local topographies with separation of time-related deviation movements of the measuring head guide device by separating inconsistencies of a sensor track and inconsistencies of a sensor orientation of the measuring head in the measuring head guide device from the true surface topography; and outputting an adjusted surface topography and a real track and orientation of the measuring head guide device of the measuring head.

12. The optical measuring process in accordance with claim 10, whereby to acquire the local inclination of the measurement object surface relative to the measuring head at least three measurement spots of an equilateral triangle are projected onto the measuring object surface and the inclination is determined from distance values between the measurement spots.

13. The optical measuring process in accordance with claim 10, whereby the time-related deviation movements of the measuring head guide device are acquired by means of a three-dimensional acceleration sensor on the measuring head and the measurement values of the surface topography are corrected accordingly.

14. The optical measuring process in accordance with claim 10, whereby using a vector model measuring head movements are acquired by means of determining the yawing, pitching, and rolling of the measurement head on the measuring head guide device.

15. The optical measuring process in accordance with claim 10, whereby a differential scanning process comprising the following steps is used:

determining of local slopes of the measurement object surface by calculating the difference in height between i measurement spots; and integrating the totality of the local slopes into a surface topography.

16. The optical measuring process in accordance with claim 14, whereby the differential scanning process acquires path differences between two measurement spots of a measurement head with a fibre end and the measurement spots of two focussing lenses, and whereby the difference in optical path to the two measurement spots is measured by means of spectral interferometry (OCT).

17. The optical measuring process in accordance with claim 10, whereby measurement spots arranged in a line in the direction of scanning are positioned at different distances.

18. The optical measuring process in accordance with claim 10, whereby consecutive scanning pulses follow one another at different time intervals.

19. The optical measuring process in accordance with claim 10, whereby the measurement spots are scanned at different clock speeds.

20. An optical measuring device for acquiring a surface topography of a measurement object comprising:

a measuring device with a measuring head in a measuring head guide device for chromatic confocal acquisition of the surface topography;

a spectrally broadband light source that supplies i fibres with broadband light via Y-couplers i;

a fibre array with the i fibres for i measurement channels arranged in the measuring head;

a common measuring head optic that forms a spot array with i measurement spots on the measurement object, the i measurement spots comprising a group of four measurement spots, the group of four measurement spots comprising three measurement spots arranged in a triangle for acquiring a local inclination of the measurement surface relative to the measuring head and a central measurement spot, the central measurement spot being arranged within the triangle formed by the three measurement spots;

means for acquiring and digitizing i reflection spectra of the i measurement channels in i spectrometers; and an evaluation unit configured to evaluate the digitized i reflection spectra for removing time variations in systematic measurement errors and time-related deviation movements of the measuring head guide device based on the acquired local inclination of the measurement surface relative to the measuring head.

21. The optical measuring device in accordance with claim 20, whereby the i measurement channels are connected via a multiplexer to a spectrometer.

22. The optical precision measuring device in accordance with claim 20, whereby the measuring head is designed such that the distance values of the channels assume a fixed order of priority.

23. The optical precision measuring device in accordance with claim 20 that also comprises the following means for removing time variations in systematic measurement errors and time-related deviation movements of the measuring head guide device from the i reflection spectra:

means designed for acquiring geometric distance values of the i measurement channels at time t(j);

means designed for acquiring three-dimensional position values for the i measurement spots on the measurement object surface at time t(j);

means designed for acquiring a local inclination of the measurement object surface relative to the measuring head;

means designed for outputting an adjusted surface topography; and means designed for outputting a real track and a real orientation of the measuring head guide device.

24. An optical measuring device for acquiring a surface topography of a measurement object comprising:

a measuring device with a measuring head in a measuring head guide device for spectral interferometric OCT acquisition of the distance to the surface topography;

a spectrally broadband light source that supplies i fibres with broadband light via i Y-couplers;

a fibre array with the i fibres for i measurement channels arranged in the measuring head;

a common measuring head optic that forms a spot array with i measurement spots on the measurement object, the i measurement spots comprising a group of four measurement spots, the group of four measurement spots comprising three measurement spots arranged in a triangle for acquiring a local inclination of the measurement surface relative to the measuring head and a central measurement spot, the central measurement spot being arranged within the triangle formed by the three measurement spots;

means for acquiring and digitizing i reflection spectra of the i measurement channels in i spectrometers; and an evaluation unit configured to evaluate the digitized i reflection spectra for removing time variations in systematic measurement errors and time-related deviation movements of the measuring head guide device based on the acquired local inclination of the measurement surface relative to the measuring head.

25. The optical measuring device in accordance with claim 24, whereby the i measurement channels are connected via a multiplexer to a spectrometer.

26. The optical precision measuring device in accordance with claim 25, whereby the measuring head is designed such that the distance values of the channels assume a fixed order of priority.

27. The optical precision measuring device in accordance with claim 24 that also comprises the following means for removing time variations in systematic measurement errors and time-related deviation movements of the measuring head guide device from the i reflection spectra:

means designed for acquiring geometric distance values of the i measurement channels at time t(j);

means designed for acquiring three-dimensional position values for the i measurement spots on the measurement object surface at time t(j);

means designed for acquiring a local inclination of the measurement object surface relative to the measuring head;

means designed for outputting an adjusted surface topography; and means designed for outputting a real track and a real orientation of the measuring head guide device.

* * * * *